United States Patent Office 2,933,396
Patented Apr. 19, 1960

2,933,396

BAKING POWDER

Frank G. Miller, Lake Bluff, Ill., assignor to General Foods Corporation, White Plains, N.Y., a corporation of Delaware No Drawing. Application April 30, 1958
Serial No. 731,889

8 Claims. (Cl. 99—95)

The present invention relates to a new and improved baking powder composition.

Baking powders have long been used in the baking of biscuits, cakes, and various oven goods to impart to them an open or leavened texture. They generally contain a water soluble bicarbonate (soda), one or more acid reacting ingredients, and an inert filler, such as starch, calcium carbonate, or flour. In the presence of water at room temperature, the acid reacting ingredients and the bicarbonate react to provide some of the available carbon dioxide. This is the condition obtained in the batter stage of preparing baked goods. During subsequent baking of the batter, additional carbon dioxide is evolved from the baking powder composition. The heat of baking not only accelerates the evolution of carbon dioxide, but also causes the gas bubbles which have been entrapped in the batter to expand. Thereafter the batter is set in the well-known manner.

Various materials, such as mono-calcium phosphate, sodium aluminum sulfate, potassium acid tartrate, disodium dihydrogen pyrophosphate, and calcium lactate, have been employed as the acid ingredients of conventional baking powders. Of these, sodium aluminum sulfate and/or monocalcium phosphate are most frequently used. These two materials, designated hereinafter as SAS and MCP for convenience, are used independently or combined in various proportions depending on the speed of reaction desired. Commercial SAS reacts to a relatively small extent with the bicarbonate in the batter stage, the major part of the reaction occurring during baking. MCP, on the other hand, is "faster acting" and reacts to a major extent in the batter stage, leaving the lesser amount of reaction to occur in the course of baking. A combination baking powder which employs both SAS and MCP is called a "double acting" baking powder because of its ability to liberate a certain amount of the available carbon dioxide in the batter stage while also releasing a substantial amount thereafter in the baking stage.

It is readily apparent that the most perfect baking powder is one which provides the optimum amount of gas at the optimum rate at each stage in the preparation of the baked goods. In the past, many attempts have been made to alter the amounts of gas evolved in the various stages of preparing baked goods as well as to alter the rate at which the gas is evolved. The principal problem, however, concerns the amount of gas liberated in the baking stage. Although SAS provides a greater amount of carbon dioxide in the baking stage, its use is limited. Too great an amount of SAS imparts an off-flavor to the baked goods containing it. The deficiency of carbon dioxide evolution in the baking stage cannot be corrected by using more of a faster acting acid ingredient such as MCP because the amount of gas evolved in the batter stage will result in overleavening.

The limitations involved in formulating a baking powder result from the well established standards for its use, as well as its functional requirements. All standard recipes calling for the use of baking powder specify a teaspoon or a fraction thereof as the unit of measure. Consequently, a standard has been developed which is adhered to by most of the manufacturers of baking powder in the United States. A standard "level teaspoon" comprises about 4.93 cc. and this amount of baking powder must be capable of providing from about 0.50 to about 0.63 g. of carbon dioxide.

In addition to the above limitations, a baking powder to be sold in normal retail channels must remain stable for a considerable length of time. This period includes the time required for commercial distribution and sale, as well as the time required for use in the home. The stability problem with baking powder is due to moisture absorption causing the carbon dioxide evolution to occur prematurely. The desired stability and the required volume and weight standards are presently achieved by the use of a cornstarch filler. It provides the necessary bulk to the product. Also, it physically spaces the acid reacting ingredients from the bicarbonate and has the important property of preferentially absorbing moisture which may contact the baking powder.

Cornstarch is not entirely satisfactory, however, because of its relatively high cost. The baking powder industry, therefore, has long sought a replacement for it. Calcium carbonate has been used but it fails to provide any worthwhile stabilization. Flour is also unacceptable because it becomes rancid. Other fillers fail for one reason or another. As a result, substantially all baking powders are presently prepared with cornstarch. In view of its relatively high cost, it would be desirable to employ another filler as a total or partial replacement for the cornstarch, preferably one which also allows further savings to be realized by reducing the bulk density of the baking powder formulation while meeting the leavening gas requirements of the aforementioned standard level teaspoon.

It is an object of the present invention to provide a baking powder having a filler which permits an economical reduction in the bulk density of baking powders, does not introduce a stability problem and permits a reduction in the level of active ingredients required to develop a given volume of leavening gas per level teaspoon of baking powder.

It has now been discovered that an insoluble hydrated silicate such as hydrated calcium silicate can be employed as a total or partial replacement for the fillers of the prior art in baking powder.

It has been found that such silicates are compatible with the active ingredients of baking powder and extend their normal shelf life. Whether the silicate is employed as a total or partial replacement for starch, the bulk density of the product can be reduced to a greater extent than has heretofore been possible, allowing savings in the total cost in the filler material employed.

It has also been quite unexpectedly noted, that when silicates are employed in baking powder, a saving in the level of active chemical ingredients can be realized. In the practice of compounding baking powder the level of acid salts necessary to liberate the greatest proportion of the carbon dioxide gas theoretically available from the soda is substantially greater than the level which is theoretically required. Thus in a standard baking powder formulation employing cornstarch as a filler about 100 lbs. of mono-calcium phosphate (MCP) would be required to liberate a maximum of 91.8% of the carbon dioxide gas theoretically available from 83 lbs. of sodium bicarbonate. When employing hydrated calcium silicate either as a complete or a partial replacement for starch "filling" in baking powder, it is observed that the acid salts are more effective in producing carbon dioxide gas in that a substantially greater proportion of the theoretically available carbon dioxide gas is released from the soda. As a consequence, this invention offers the opportunity to effect savings in reducing the level of acid salts required to develop a given volume of leavening gas per teaspoon or other measure of baking powder.

The preferred silicate employed as a filler is hydrated calcium silicate, a soft, highly absorptive, white, finely-precipitated mineral having the following physical and chemical properties:

| | |
|---|---:|
| Bulk density _____lbs./cu. ft__ | 12 |
| Specific gravity _____ | 2.1 |
| Average particle size _____microns__ | 0.030 |
| Surface area _____sq. meters/gm__ | 80 |
| pH in 5% water suspension _____ | 10.0 |
| Loss at 105° C. _____percent__ | 5 |
| Loss on ignition _____do____ | 15 |
| $SiO_2$ _____do____ | 64 |
| CaO _____do____ | 18 |
| $Fe_2O_3$ _____do____ | 0.15 |
| $Al_2O_3$ _____do____ | 0.6 |
| MgO _____do____ | 0.1 |
| NaCl _____do____ | 1.5 |

Although this silicate is preferred, other insoluble silicates may be employed, such as magnesium silicate.

Experimentation has shown that where a hydrated calcium silicate is substituted for cornstarch in a baking powder composition there is a considerable reduction in the percent of the initial carbon dioxide lost in the baking powder upon storage. After six weeks' accelerated storage of the baking powder composition at 70° F. and 62% relative humidity the baking powder composition containing a cornstarch filler lost 10.6% of the initial carbon dioxide present. On the other hand, the identical baking powder composition containing a hydrated calcium silicate instead of cornstarch lost only 7.2% of the initial carbon dioxide present.

In various of the formulations employing the filler material of the present invention, the performances of baked goods such as cakes and biscuits were rated high in scores of volume and texture. Typical formulations of baking powders which may be employed and yield improvements are as follows:

| Ingredients | Composition (Percent) by Weight for Formula | | | |
|---|---:|---:|---:|---:|
| Soda | 38 | 35 | 32 | 40 |
| MCP | 10 | 9 | 9 | 10 |
| $CaSO_4$ | 10 | 13 | 15 | |
| SAS | 28 | 25 | 24 | 34 |
| Cornstarch | | 6 | 13 | |
| Hydrated calcium silicate | 14 | 12 | 7 | 16 |
| | 100 | 100 | 100 | 100 |

While the present invention has been described with particular reference to specific examples, it is not to be limited thereby, but reference is to be had to the appended claims for a definition of its scope.

What is claimed is:

1. Baking powder containing an insoluble hydrated silicate.
2. Baking powder containing a hydrated calcium silicate.
3. Baking powder comprising soda, at least one acid salt for reaction with the soda to produce carbon dioxide, starch, and an insoluble hydrated silicate.
4. Baking powder comprising sodium bicarbonate, mono-calcium phosphate, sodium aluminum sulfate, and an insoluble hydrated silicate.
5. Baking powder comprising sodium bicarbonate, mono-calcium phosphate, sodium aluminum sulfate, starch, and an insoluble hydrated silicate.
6. Baking powder comprising sodium bicarbonate, mono-calcium phosphate, sodium aluminum sulfate, and hydrated calcium silicate powder.
7. Baking powder comprising sodium bicarbonate, mono-calcium phosphate, sodium aluminum sulfate, starch, and hydrated calcium silicate powder.
8. Baking powder comprising sodium bicarbonate, mono-calcium phosphate, sodium aluminum sulfate, calcium sulfate, starch, and hydrated calcium silicate powder.

References Cited in the file of this patent

UNITED STATES PATENTS

| | | |
|---|---|---|
| 647,695 | Clotworthy | Apr. 17, 1900 |
| 2,768,899 | Waldo | Oct. 30, 1956 |
| 2,793,121 | Novitsky | May 21, 1957 |